(12) United States Patent
Meillan et al.

(10) Patent No.: US 10,537,088 B2
(45) Date of Patent: Jan. 21, 2020

(54) SYSTEM FOR STORING AND COOLING MILK, MILKING SYSTEM, AND METHOD FOR COOLING MILK

(71) Applicant: DELAVAL HOLDING AB, Tumba (SE)

(72) Inventors: Jean-Pierre Meillan, Tumba (SE); Jerzy Stopa, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 435 days.

(21) Appl. No.: 15/312,745

(22) PCT Filed: May 19, 2015

(86) PCT No.: PCT/SE2015/050560
§ 371 (c)(1),
(2) Date: Nov. 21, 2016

(87) PCT Pub. No.: WO2015/178834
PCT Pub. Date: Nov. 26, 2015

(65) Prior Publication Data
US 2017/0150695 A1    Jun. 1, 2017

(30) Foreign Application Priority Data

May 20, 2014   (SE) ........................................ 1450594
Nov. 10, 2014  (SE) ........................................ 1451344

(51) Int. Cl.
*A01J 9/04*          (2006.01)

(52) U.S. Cl.
CPC .......... *A01J 9/04* (2013.01); *F25B 2600/0253* (2013.01); *F25B 2700/197* (2013.01);
(Continued)

(58) Field of Classification Search
CPC .... F25B 2600/0253; F25B 2700/21151; F25B 2700/1933; F25B 2700/197; F25B 2700/2117; A01J 9/04
See application file for complete search history.

(56) References Cited

U.S. PATENT DOCUMENTS

| 8,485,789 B2 | 7/2013 | Gu et al. |
| 2003/0131619 A1 | 7/2003 | Lidman et al. |

(Continued)

FOREIGN PATENT DOCUMENTS

| EP | 1 260 777 A1 | 11/2002 |
| EP | 1 251 732 B1 | 10/2004 |

(Continued)

OTHER PUBLICATIONS

International-Type Search Report, dated Jun. 5, 2015, from corresponding PCT application.

(Continued)

*Primary Examiner* — David J Teitelbaum
(74) *Attorney, Agent, or Firm* — Young & Thompson

(57) ABSTRACT

A system for storing and cooling milk includes a cooling tank to store milk, a first sensor monitoring the filling level of milk in the cooling tank, and a cooling system cooling the milk in the cooling tank including a cooling device, a second sensor, and a control device. The cooling device includes an evaporator, a varying-capacity modulated scroll compressor connected with its suction side to the evaporator, a condenser connected to the high pressure side of the compressor, and an expansion valve interconnected between the condenser and the evaporator. The second sensor monitors a parameter indicative of the pressure at the suction side of the compressor. The control device is operatively connected to the first sensor to receive the monitored filling level, the second sensor to receive the monitored parameter, and the (Continued)

compressor to control the capacity thereof in response to the monitored filling level and the monitored parameter.

11 Claims, 3 Drawing Sheets

(52) U.S. Cl.
CPC ............... *F25B 2700/1933* (2013.01); *F25B 2700/2117* (2013.01); *F25B 2700/21151* (2013.01)

(56) References Cited

U.S. PATENT DOCUMENTS

| | | | |
|---|---|---|---|
| 2006/0124065 A9 * | 6/2006 | Lidman | A01J 5/0175 119/14.09 |
| 2013/0269367 A1 | 10/2013 | Meillan | |
| 2015/0267954 A1 * | 9/2015 | Ryu | F25B 49/02 62/117 |

FOREIGN PATENT DOCUMENTS

| | | |
|---|---|---|
| EP | 1 370 131 B1 | 6/2006 |
| EP | 2 290 306 A2 | 3/2011 |
| JP | 2010-022266 A | 2/2010 |

OTHER PUBLICATIONS

International Search Report, dated Sep. 14, 2015, from corresponding PCT application.
https://www.youtube.com/watch?v=YNeoFebbU6I; Link to a film retrieved from the Internet, Uploaded on Jul. 27, 2011.

* cited by examiner

SYSTEM FOR STORING AND COOLING MILK, MILKING SYSTEM, AND METHOD FOR COOLING MILK

TECHNICAL FIELD

The technical field relates generally to cooling of milk and particularly to systems for storing and cooling milk, milking systems, and methods for cooling milk.

RELATED ART

In dairy farming animals are milked and their milk is stored in a milk storage tank for collection on a regular time basis, e.g. every second day. In order to maintain the quality of the milk, and to minimize the bacterial growth and contents of free fatty acids (FFA) in the milk, it is cooled to temperatures around 4° C. as quickly as possible. It is necessary to be careful during cooling of the milk because freezing of milk will have a detrimental effect on the milk quality.

At a dairy farm provided with an automatic milking system, the milk usually enters the milk storage tank in small amounts spread during the day and night, compared to a dairy farm without an automatic milking system, where all animals are milked together e.g. three times a day. The milk storage tank is usually equipped with a cooling device, which cools the milk to around 4° C. and maintains this temperature in a filled milk storage tank. When the milk storage tank only contains small amounts of milk, there is a considerable risk of cooling the milk too much since the cooling device typically operates at full capacity.

Usually the cooling of milk in a milk storage tank is controlled in response to the temperature of the milk in the tank. The milk temperature is usually measured on the outside of the tank due to hygienic requirements, and this results in a rather slow response when the temperature of the milk within the tank is changed. Such a sluggish temperature response gives rise to problems, in particular when the volume of stored milk is small. The temperature of a small milk volume is lowered rapidly at the risk of freezing the milk.

EP 1251732 B1 relates to a method and system for controlling the cooling of small milk quantities in a cooling tank having a bottom wall portion with a milk cooling surface (within the tank being part of a cooling circuit), and agitator means within the tank for stirring the milk therein. The gist of the invention is: a) providing a means for measuring the milk quantity in the tank, and a temperature transducer for monitoring the milk temperature in the tank, b) providing, in the cooling circuit, an evaporator connected to the bottom wall portion of the tank, a compressor, and a condenser, c) controlling the temperature of the refrigerant in the evaporator by regulating the vaporizing pressure, so that the temperature of the milk cooling surface is always higher than 0° C., whereas the refrigerant temperature in the evaporator is below 0° C. when the compressor is running, d) monitoring the milk quantity in the tank, and, when same turns out to be sufficient/insufficient for the agitator means to work properly, starting/stopping the operation of the agitator means.

EP 1370131 B1 relates to a method for cooling milk in a milk storage tank of an automatic milking system comprising the steps of (i) measuring an amount of extracted milk by means of a milk flow meter; (ii) determining a cooling need for milk stored or to be stored in the milk storage tank based on the amount of milk; (iii) measuring a quantity indicative of a temperature of an inner surface area of a bottom portion of the milk storage tank; and cooling the bottom portion of the milk storage tank in consecutive periods, such that each period of cooling is followed by a respective period of non-cooling, wherein the duration of each period of cooling and/or non-cooling is based on the measured quantity indicative of the inner surface area temperature, and the cooling need.

SUMMARY

It is an aim of this document to reveal novel systems for storing and cooling milk and methods for cooling milk, which are safe, fast, accurate, precise, efficient, and reliable. The milk ought to be cooled as soon as possible after milking and fastly down to temperatures around 4° C., while the risk for locally freezing milk should be eliminated, or at least minimized.

A first aspect refers to a system for storing and cooling milk comprising a cooling tank provided to store milk, a first sensor provided to monitor a filling level of milk in the cooling tank, and a cooling arrangement for cooling the milk in the cooling tank comprising a cooling device, a second sensor, and a control device.

The first sensor may be a sensor provided to measure the filling level of milk in the cooling tank indirectly, e.g. by means of measuring the amount of milk transferred to the cooling tank, such as a milk flow sensor (e.g. arranged upstream of the cooling tank). Alternatively, the sensor may be a level sensor, a threshold level sensor, or a float switch.

The cooling device comprises an evaporator, a compressor connected with its suction side to the evaporator, a condenser connected to the high pressure side of the compressor, and an expansion valve interconnected between the condenser and the evaporator, thereby forming a closed circuit, in which a refrigerant can be circulated, wherein the evaporator is in heat exchange contact with at least a portion of the bottom surface of the cooling tank.

The compressor has a varying capacity, which can be controlled. For instance, the compressor may be a capacity modulated scroll compressor, wherein the capacity can be controlled by means of controlling the modulation of the compressor. The capacity modulated scroll compressor may have two scroll members and a biasing chamber which contains a pressurized fluid. The pressurized fluid within the chamber biases the two scroll members together. A valve assembly is in communication with this biasing chamber and releases the pressurized fluid on demand to remove the load, biasing the two scroll members together. When the biasing load is removed, the two scroll members separate, creating a leakage path between discharge and suction to reduce the capacity of the scroll compressor. Such kind of scroll compressor is commercially available from Copeland Corporation.

Typically, the scroll compressor can be modulated by means of modulating the operation of the valve assembly controlling the biasing load of the two scroll members as exerted by the pressurized fluid such that the scroll compressor is operated with alternating high biasing load and no biasing load in a cyclic manner. When the biasing load is high, the two scroll members are biased together, and the capacity of the scroll pump is at its maximum. When the biasing load is removed, the two scroll members separate, and the capacity of the scroll pump is at its minimum. The modulation level controls the time period, at which the biasing load is high, relative the time period, at which the biasing load is removed. If the modulation is increased, the time period, at which the biasing load is high, is increased relative the time period, at which the biasing load is removed, and correspondingly, if the modulation is decreased, the time period, at which the biasing load is high, is decreased relative the time period, at which the biasing load is removed. As a result, the modulation level controls the capacity of the scroll pump.

The second sensor, which may be a pressure sensor, is provided to monitor a parameter indicative of the pressure at the suction side of the compressor or in the evaporator. Alternatively, the second sensor may be a pressure sensor provided to monitor a parameter indicative of the temperature at the suction side of the compressor or in the evaporator.

The control device is operatively connected (i) to the first sensor to receive the monitored filling level of milk in the cooling tank, (ii) to the second sensor to receive the monitored parameter r, and (iii) to the compressor to control the capacity thereof in response to the monitored filling level of milk in the cooling tank and the monitored parameter.

In particular, the control device is configured to control the capacity of the compressor by means of changing the modulation of the compressor such that the pressure or temperature at the suction side of the compressor or in the evaporator is regulated towards a first desired value when the monitored filling level of milk in the cooling tank is below a first threshold level.

The first desired value is set such that the milk in the cooling tank will be cooled as fast as possible while the milk will not freeze during the cooling.

For instance, the first desired value may be set to a pressure, at which the refrigerant has a boiling temperature of between about −5 and +3° C., preferably between about −3 and +1° C., more preferably between about −2 and 0° C. and most preferably about −1° C.

The first desired value is advantageously set to a pressure, at which the refrigerant has a heat exchange capacity, which ensure that milk in the cooling tank does not freeze even when there are only small amounts of milk therein such as in an initial phase of the filling of the cooling tank with milk from an automated milking system wherein the milking animals are not milked batch wise, but e.g. on a voluntary basis.

The system may comprise an agitator arrangement within the cooling tank for agitating milk therein, wherein the agitator arrangement requires the filling level of milk in the cooling tank to be above the first threshold level to be capable of agitating the milk, or to be capable of agitating the milk appropriately or at a maximum speed.

When the level of milk in the cooling tank is high enough for the agitator arrangement to operate, the cooling device can be run harder, since the agitation of milk in the cooling tank assists in evening out the temperature differences in the milk, thereby avoiding local freezing of milk.

By the system disclosed, it can be assured that the most effective cooling will be obtained at each instant. At low levels of milk, a set point of the evaporation pressure or temperature is set to avoid local freezing of milk, whereas at higher levels of milk, the cooling device can be run harder. The control device may comprise a PID (proportional-integral-derivative) controller for regulating the pressure or temperature at the suction side of the compressor or in the evaporator towards the desired set point depending on the level of milk in the cooling tank.

In one embodiment, the system comprises a temperature sensor for sensing a temperature of the milk in the cooling tank, wherein the control device is configured to control the compressor in response to the sensed temperature when the monitored filling level of milk in the cooling tank is above the first threshold level. The control device may be configured to control the compressor in response to the sensed temperature such that the compressor is only run intermittently and then at full capacity to obtain thermostat based cooling.

In another embodiment, the control device is configured to control the capacity of the compressor such that the pressure or temperature at the suction side of the compressor or in the evaporator is regulated towards a second desired value when the monitored filling level of milk in the cooling tank is above the first threshold level, wherein the second desired value is set lower than the first desired value. The second desired value may be a pressure, at which the refrigerant has a boiling temperature of between about −10 and 0° C., preferably between about −8 and −2° C., and most preferably between about −6 and −4° C.

The cooling may thus be performed in two different modes using two different set points of the evaporation pressure or temperature depending on the level of milk in the cooling tank, in order to improve the cooling procedure to thereby not deteriorate the quality of the milk in the cooling tank. The control device may comprise a PID controller for regulating the pressure or temperature at the suction side of the compressor or in the evaporator towards the desired set point depending on the level of milk in the cooling tank.

In yet another embodiment, the control device is configured to control the capacity of the compressor such that the pressure or temperature at the suction side of the compressor or in the evaporator is regulated towards a second desired value when the monitored filling level of milk in the cooling tank is above the first threshold level, but below a second threshold level, and to control the compressor in a different manner when the monitored filling level of milk in the cooling tank is above the second threshold level.

The embodiment may comprise a temperature sensor for sensing a temperature of the milk in the cooling tank, wherein the control device is configured to control the compressor in response to the sensed temperature when the monitored filling level of milk in the cooling tank is above the second threshold level by thermostat based cooling.

Here, the cooling can be performed in three different modes depending on the level of milk in the cooling tank wherein thermostat cooling is performed in the third cooling mode (when the level of milk in the cooling tank is sufficiently high), in order to further improve the cooling procedure to thereby not deteriorate the quality of the milk in the cooling tank.

Alternatively, the control device may be configured to control the capacity of the compressor such that the pressure or temperature at the suction side of the compressor is regulated towards a third desired value when the monitored filling level of milk in the cooling tank is above the second threshold level, wherein the third desired value is preferably lower than the second desired value.

Here, the cooling may be performed in three different modes using three different set points depending on the level of milk in the cooling tank, in order to further improve the cooling procedure to thereby not deteriorate the quality of the milk in the cooling tank. The control device may comprise a PID controller for regulating the pressure or temperature at the suction side of the compressor or in the evaporator towards the respective set point depending on the level of milk in the cooling tank.

It shall be appreciated that, the control device may be configured to retrieve more than two threshold levels, such as N threshold levels, N>2, to repeatedly compare the monitored filling level of milk in the cooling tank with the N threshold levels, and to control the capacity of the compressor, in each instant, in one of N+1 cooling modes, depending on the monitored filling level in relation to the N threshold levels.

A second aspect refers to a milking system comprising a milking device for milking animals and any embodiment of the system for storing and cooling milk of the first aspect connected to the milking device to collect milk as milked by the milking device. The milking system may be an automated milking system wherein the milking animals are not milked batch wise in a milking session, but e.g. on a voluntary basis, and wherein as a consequence the milk is pumped to the cooling tank in smaller amounts at a time.

A third aspect refers to a method for cooling milk in a cooling tank provided to store milk by a cooling device comprising an evaporator, a compressor connected with its suction side to the evaporator, a condenser connected to the high pressure side of the compressor, and an expansion valve interconnected between the condenser and the evaporator, thereby forming a closed circuit, in which a refrigerant can be circulated, wherein the evaporator is in heat exchange contact with at least a portion of the bottom surface of the cooling tank and the compressor has a varying capacity, which can be controlled. According to the method, a filling level of milk in the cooling tank is monitored, a parameter indicative of the pressure or temperature at the suction side of the compressor or in the evaporator is monitored, and the capacity of the compressor is controlled in response to the monitored filling level of milk in the cooling tank, and the monitored parameter.

The compressor is provided as a capacity modulated scroll compressor, wherein the capacity can be controlled by means of changing the modulation of the compressor; and the capacity of the compressor is controlled by means of changing the modulation of the compressor such that the pressure or temperature at the suction side of the compressor or in the evaporator is regulated towards a first desired value when the monitored filling level of milk in the cooling tank is below a first threshold level.

Such a method for cooling milk down to temperatures around 4° C. is safe, fast, accurate, precise, efficient, and reliable, while the risk for local freezing of milk is eliminated, or at least minimized.

A fourth aspect refers to a system for storing and cooling milk comprising a cooling tank provided to store milk, a first sensor provided to monitor the filling level of milk in the cooling tank, and a cooling arrangement for cooling the milk in the cooling tank comprising a cooling device, and a control device, wherein the cooling device comprises an evaporator, a compressor connected with its suction side to the evaporator, a condenser connected to the high pressure side of the compressor, and an expansion valve interconnected between the condenser and the evaporator, thereby forming a closed circuit, in which a refrigerant can be circulated. The evaporator is in heat exchange contact with at least a portion of the bottom surface of the cooling tank, and the compressor has a varying capacity, which can be controlled.

The control device is (i) operatively connected to the first sensor to receive the monitored filling level of milk in the cooling tank, (ii) configured to retrieve a threshold level and to repeatedly compare the monitored filling level of milk in the cooling tank with the first threshold level, and (iii) operatively connected to the compressor to control the capacity thereof in response to the monitored filling level of milk in the cooling tank such that the capacity is kept on a first level, such as e.g. between 20 and 60% of a maximum capacity, when the monitored filling level of milk in the cooling tank is below the first threshold level and on a second level, such as e.g. 100% of the maximum capacity, when the monitored filling level of milk in the cooling tank is above the threshold level.

The control device may comprise input means, through which the capacity at least on the first level can be set by an operator, e.g. on a farm at start-up by monitoring evaporation pressures and temperatures.

In one embodiment, the system comprises an agitator arrangement within the cooling tank for agitating milk therein, wherein the agitator arrangement requires the filling level of milk in the cooling tank to be above the threshold level to be capable of agitating the milk.

A fifth aspect refers to a milking system comprising a milking device for milking animals and an embodiment of the system for storing and cooling milk of the fourth aspect connected to the milking device to collect milk as milked by the milking device.

A sixth aspect refers to a method for cooling milk in a cooling tank provided to store milk by a cooling device comprising an evaporator, a compressor connected with its suction side to the evaporator, a condenser connected to the high pressure side of the compressor, and an expansion valve interconnected between the condenser and the evaporator, thereby forming a closed circuit, in which a refrigerant can be circulated, wherein the evaporator is in heat exchange contact with at least a portion of the bottom surface of the cooling tank and the compressor has a varying capacity, which can be controlled. According to the method, the filling level of milk in the cooling tank is monitored, the monitored filling level of milk in the cooling tank is repeatedly compared with a threshold level, and the capacity of the compressor is controlled in response to the monitored filling level of milk in the cooling tank such that the capacity is kept on a first level, such as e.g. between 20 and 60% of a maximum capacity, when the monitored filling level of milk in the cooling tank is below the threshold level and on a second level, such as e.g. 100% of the maximum capacity, when the monitored filling level of milk in the cooling tank is above the threshold level, wherein the second level is higher than the first level.

The fourth to sixth aspects comprise approaches wherein the capacity levels are changed between set levels depending on the level of milk in the cooling tank. Such approaches for cooling milk down to temperatures of about 4° C. can be simple, safe, fast, accurate, efficient, and reliable, while the risk for locally freezing milk is minimized.

Each of the above approaches may be modified to include means to detect whether there is milk or not in the cooling tank, wherein the control device may be configured to keep the compressor switched off, or to run the compressor in a low cooling mode, when no milk is detected in the cooling tank such that the first milk entering the cooling tank is prevented from freezing.

Further characteristics and advantages will be evident from the detailed description of embodiments given hereinafter, and the accompanying FIGS. 1-4, which are given by way of illustration only.

DETAILED DESCRIPTION OF EMBODIMENTS

Figure 1:
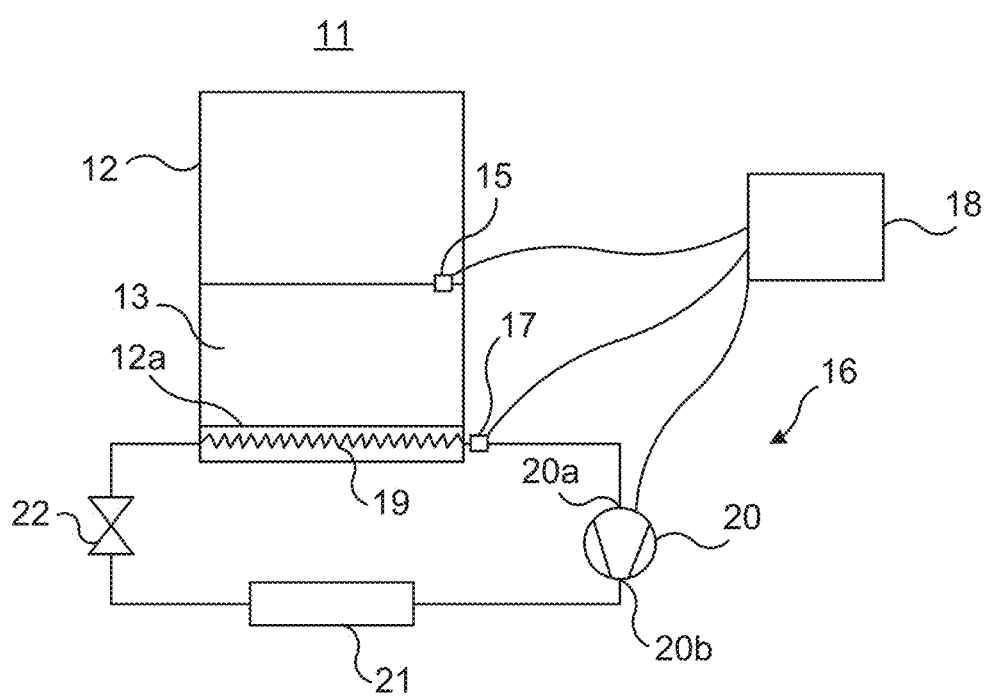
FIG. 1 illustrates, schematically, in side view, main parts of a system for storing and cooling milk according to one embodiment.

FIG. 1 illustrates, schematically, in side view, main parts of a system 11 for storing and cooling milk according to one embodiment.

The system 11 for storing and cooling milk comprises a cooling tank 12 provided to store milk 13, a first sensor 15 provided to monitor the filling level L of milk in the cooling tank 12, and a cooling arrangement for cooling the milk in the cooling tank 12 comprising a cooling device 16, a second sensor 17, and a control device 18.

The first sensor 15 may be a sensor provided to measure the filling level L of milk in the cooling tank 12 indirectly, e.g. by means of measuring the amount of milk transferred to the cooling tank 12. The first sensor 15 may e.g. be a milk flow sensor (e.g. arranged upstream of the cooling tank), a level sensor, a threshold level sensor, or a float switch. It may be provided to monitor the exact filling level L of milk in the cooling tank 12 at each instance to provide a reading at each instance, or it may be provided to only check whether the filling level exceeds a threshold or not. In the latter case, the first sensor 15 may be implemented as fixedly located optical sensor.

The cooling device comprises an evaporator 19, a compressor 20 connected with its suction side 20a to the evaporator 19, a condenser 21 connected to the high pressure side 20b of the compressor 20, and an expansion valve 22 interconnected between the condenser 21 and the evaporator 19, thereby forming a closed circuit, in which a refrigerant can be circulated.

The evaporator 19 is in heat exchange contact with at least a portion of the bottom surface 12a of the cooling tank 12.

The compressor 20 has a controllable varying capacity. It may be a capacity modulated scroll compressor, wherein the capacity can be controlled by means of controlling the modulation of the compressor 20. A higher modulation corresponds to a higher pump capacity, and a lower modulation corresponds to a lower pump capacity.

The compressor 20 may be a scroll compressor having two scroll members and a biasing chamber which contains a pressurized fluid. The pressurized fluid within the chamber biases the two scroll members together. A valve assembly is in communication with this biasing chamber and releases the pressurized fluid on demand to remove the load, biasing the two scroll members together. When the biasing load is removed, the two scroll members separate, creating a leakage path between discharge and suction to reduce the capacity of the scroll compressor. Such kind of scroll compressor is commercially available from Copeland Corporation and is patented through U.S. Pat. No. 6,821,092 B1, the contents of which being hereby incorporated by reference.

The second sensor 17 is provided to monitor a parameter indicative of the pressure P at the suction side 20a of the compressor 20. In one version, the second sensor 17 is a pressure sensor.

The control device 18 is operatively connected (i) to the first sensor 15 to receive the monitored filling level L of milk 13 in the cooling tank 12, (ii) to the second sensor 17 to receive the monitored parameter indicative of the pressure P at the suction side 20a of the compressor 20, and (iii) to the compressor 20 to control the capacity thereof by means of changing the modulation of the compressor 20 in response to the monitored filling level L of milk 13 in the cooling tank 12 and the monitored parameter indicative of the pressure P at the suction side 20a of the compressor 20.

Alternatively, the second sensor 17 may provided to monitor a parameter indicative of the pressure P in the evaporator 19 wherein the control device 18 is configured to control the capacity thereof by means of changing the modulation of the compressor 20 in response to the monitored parameter indicative of the pressure P in the evaporator 19.

Yet alternatively, the second sensor 17 may be a temperature sensor provided to monitor a parameter indicative of the temperature at the suction side 20a of the compressor 20 or in the evaporator 19 wherein the control device 18 is configured to control the capacity thereof by means of changing the modulation of the compressor 20 in response to the monitored parameter indicative of the temperature at the suction side 20a of the compressor 20 or in the evaporator 19.

The embodiments below can thus be modified to take the alternatives above into account.

The control device 18 is configured to retrieve a first threshold level $L1_{TH}$, to repeatedly compare the monitored filling level L of milk 13 in the cooling tank 12 with the first threshold level $L1_{TH}$, and to control the capacity of the compressor 20 such that the pressure P at the suction side 20a of the compressor 20 is regulated towards a first desired value $P_{1TH}$ when the monitored filling level L of milk 13 in the cooling tank 12 is below the first threshold level $L1_{TH}$. The first desired value $P_{1TH}$ of the pressure may set to be a pressure, at which the refrigerant has a boiling temperature of between about −5 and +3° C., preferably between about −3 and +1° C., more preferably between about −2 and 0° C. and most preferably about −1° C.3. The first desired value $P_{1TH}$ of the pressure may be set to a pressure, at which the refrigerant has a heat exchange capacity, which ensure that milk in the cooling tank 12 does not freeze even when there are only small amounts of milk therein. The first desired value $P_{1TH}$ of the pressure may thus be set by based on experimental results.

In one embodiment, the system 11 comprises a temperature sensor (not illustrated) for sensing the temperature of the milk L in the cooling tank 12, wherein the control device 18 is configured to control the compressor 20 in response to the sensed temperature when the monitored filling level of milk in the cooling tank is above the first threshold level. The control device may be configured to control the compressor in response to the sensed temperature such that the compressor is only run intermittently and then at full capacity.

In an alternative embodiment, the control device 18 may be configured to control the capacity of the compressor 20 such that the pressure P at the suction side 20a of the compressor 20 is regulated towards a second desired value $P_{2TH}$ of the pressure P at the suction side 20a of the compressor 20 when the monitored filling level L of milk 13 in the cooling tank 12 is above the first threshold level $L1_{TH}$.

Preferably, the second desired value $P_{2TH}$ of the pressure is lower than the first desired value $P_{1TH}$. The second desired value $P_{2TH}$ of the pressure may be a pressure, at which the refrigerant has a boiling temperature of between about −10 and 0° C., preferably between about −8 and −2° C., and most preferably between about −6 and −4° C.

The system 11 for storing and cooling milk may comprise an agitator arrangement 14 within the cooling tank 12 for agitating milk 13 therein, wherein the agitator arrangement 14 requires the filling level L of milk 13 in the cooling tank 12 to be above the threshold level $L_{1TH}$ to be capable of agitating the milk 13.

In one embodiment the control device 18 is configured to retrieve a second threshold level $L_{2TH}$, to repeatedly compare the monitored filling level L of milk 13 in the cooling tank 12 with the second threshold level $L_{2TH}$, to control the capacity of the compressor 12 such that the pressure P at the suction side 20a of the compressor 20 is regulated towards the second desired value $P_{2TH}$ when the monitored filling level L of milk 13 in the cooling tank 12 is above the first threshold level $L_{1TH}$, but below the second threshold level $L_{2TH}$, and to control the compressor 20 in a different manner when the monitored filling level L of milk 13 in the cooling tank 12 is above the second threshold level $L_{2TH}$.

The system 11 may comprise a temperature sensor (not illustrated) for sensing the temperature of the milk L in the cooling tank 12, wherein the control device 18 may be configured to control the compressor 20 in response to the sensed temperature when the monitored filling level of milk in the cooling tank is above the second threshold level.

Alternatively, the control device 18 may be configured to control the capacity of the compressor 20 such that the pressure P at the suction side 20a of the compressor 20 is regulated towards a third desired value $P_{3TH}$ when the monitored filling level L of milk 13 in the cooling tank 12 is above the second threshold level $L2_{TH}$, wherein the third desired value $P_{3TH}$ is lower than the second desired value $P_{2TH}$.

In another embodiment, the second sensor 17 is dispensed with, and the control device 18 is (i) operatively connected to the first sensor 15 to receive the monitored filling level L of milk 13 in the cooling tank 12, (ii) configured to retrieve a threshold level $L_{TH}$ and to repeatedly compare the monitored filling level L of milk 13 in the cooling tank 12 with the first threshold level, and (iii) operatively connected to the compressor 20 to control the capacity thereof in response to the monitored filling level L of milk 13 in the cooling tank 12 such that the capacity is kept on a first level, such as e.g. between 20 and 60% of a maximum capacity, when the monitored filling level of milk 13 in the cooling tank 12 is below the threshold level $L_{TH}$ and on a second level, such as e.g. 100% of the maximum capacity, when the monitored filling level of milk 13 in the cooling tank 12 is above the threshold level $L_{TH}$.

The control device 18 may comprise input means, through which the capacity, at least on the first level, can be set by an operator.

If the system 11 for storing and cooling milk may comprise an agitator arrangement 14 within the cooling tank 12 for agitating milk 13 therein, the agitator arrangement 14 may require the filling level of milk 13 in the cooling tank 12 to be above the threshold level $L_{TH}$ to be capable of agitating the milk 13.

Figure 2:
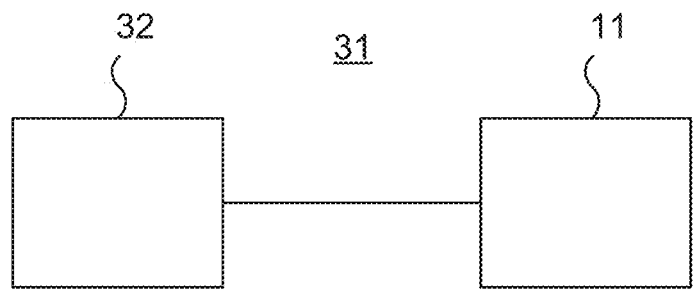
FIG. 2 illustrates, schematically, in a block scheme, a milking system comprising the system for storing and cooling milk of FIG. 1.

FIG. 2 illustrates, schematically, in a block scheme, a milking system 31 comprising the system for storing and cooling milk of FIG. 1.

The milking system 31 comprises a milking device 32 for milking animals and any embodiment of the system 11 for storing and cooling milk as disclosed herein connected to the milking device 32 to collect milk as milked by the milking device 32.

Figure 3:
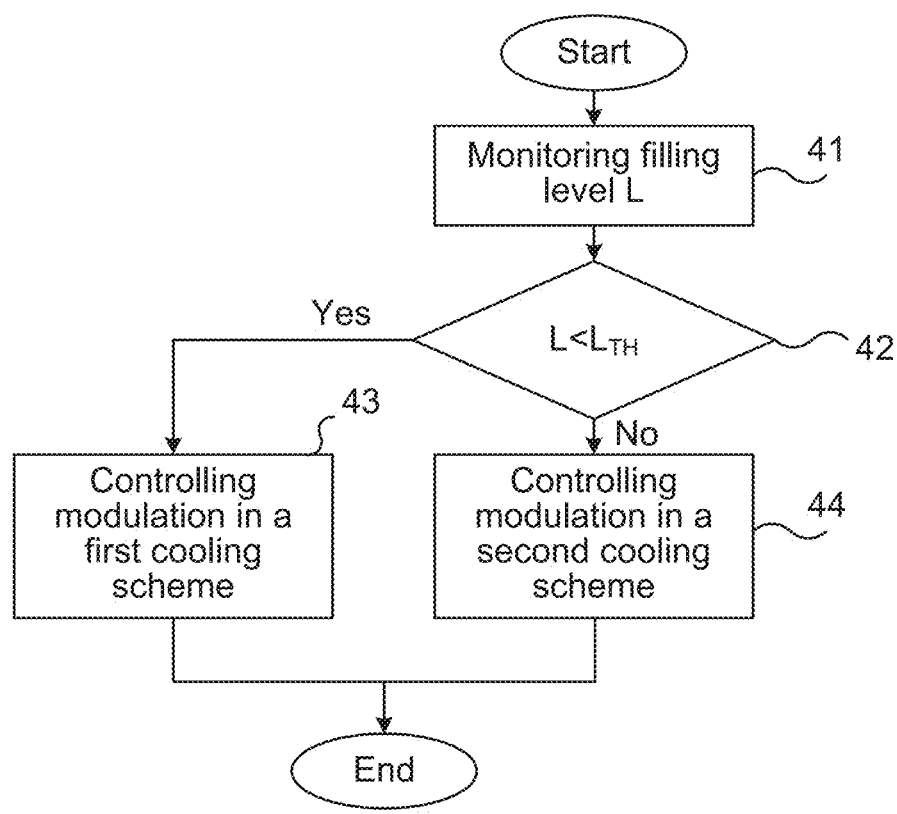
FIGS. 3 and 4 are each a schematic flow scheme of a method for cooling milk in a cooling tank according to a respective embodiment.

FIG. 3 is a schematic flow scheme of an embodiment of a method for cooling milk in a cooling tank by a cooling device as disclosed above. According to the method, the filling level L of milk in the cooling tank is, in a step 41, monitored and the monitored filling level of milk in the cooling tank is, in a step 42, repeatedly compared with a threshold level $L_{TH}$. When the monitored filling level of milk in the cooling tank is below the threshold level $L_{TH}$, the capacity of the compressor is, in a step 43, controlled in a first cooling scheme, and when the monitored filling level of milk in the cooling tank is above the threshold level, the capacity of the compressor is, in a step 44, controlled in a second cooling scheme different from the first cooling scheme.

In the first cooling scheme, the capacity of the compressor may be controlled such that the pressure at the suction side of the compressor is regulated towards a first desired value $P_{1TH}$.

In the second cooling scheme, the compressor may be controlled in response to a sensed temperature or the capacity of the compressor may be controlled such that the pressure at the suction side of the compressor is regulated towards a second desired value $P_{2TH}$. The capacity of the compressor may be controlled by a PID controller. Preferably, the second desired value $P_{2TH}$ is lower than the first desired value $P_{1TH}$.

The above steps may be repeated constantly during the cooling of the milk in the cooling tank, such that the capacity of the compressor is, in each instant, controlled in dependence on the monitored filling level L of milk in the cooling tank and the monitored parameter indicative of the pressure P at the suction side of the compressor.

Figure 4:
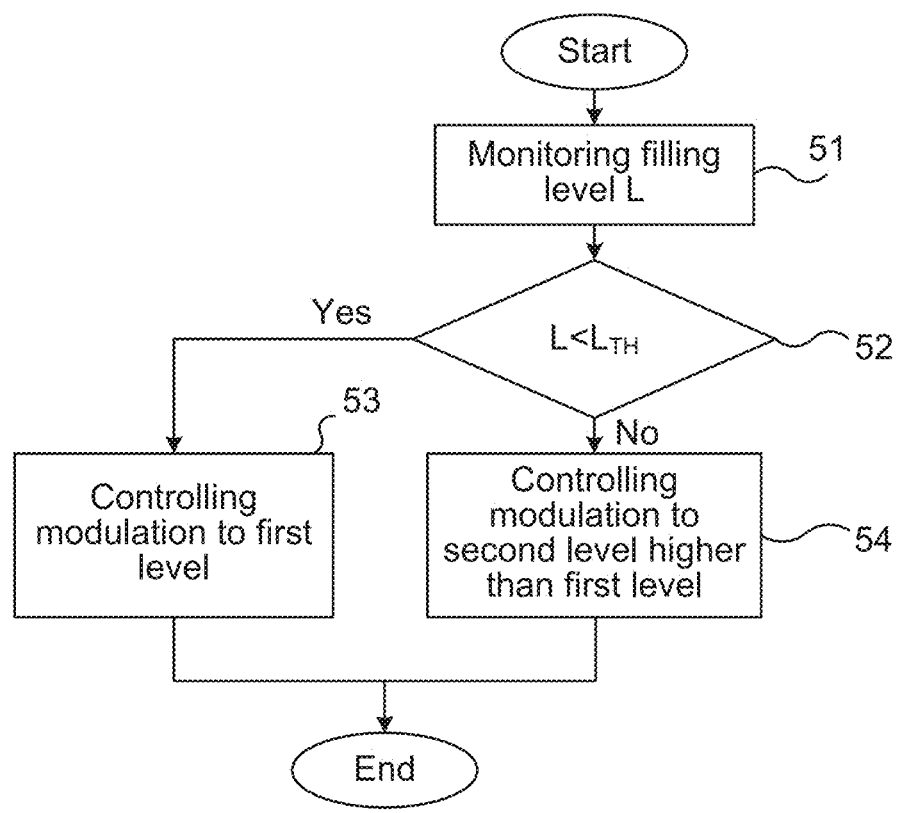

FIG. 4 is a schematic flow scheme of an embodiment of a method for cooling milk in a cooling tank by a cooling device as disclosed above. According to the method, the filling level L of milk in the cooling tank is, in a step 51, monitored and the monitored filling level of milk in the cooling tank is, in a step 52, repeatedly compared with a threshold level $L_{TH}$. When the monitored filling level of milk in the cooling tank is below the threshold level $L_{TH}$, the capacity of the compressor is, in a step 53, kept on a first level, such as e.g. 20-60% of a maximum capacity, and when the monitored filling level of milk in the cooling tank is above the threshold level $L_{TH}$, the capacity of the compressor is, in a step 54, kept on a second level, such as e.g. 100% of the maximum capacity.

Preferably, the second capacity level of is higher than the first capacity level. The capacity of the compressor can, at least on the first level, be set by an operator at installation of the cooling device.

The above steps may be repeated constantly during the cooling of the milk in the cooling tank, such that the capacity of the compressor is, in each instant, controlled in dependence on the monitored filling level of milk in the cooling tank.

Further, the embodiments of methods for cooling milk as disclosed above with reference to FIGS. 3 and 4 may be further modified to encompass variants and embodiments, which correspond to those disclosed above with respect to FIGS. 1 and 2.

The above embodiments are not limiting but only exemplifying the claimed systems and methods.

The invention claimed is:

1. A system (11) for storing and cooling milk comprising:
a cooling tank (12) configured to store milk (13);
a first sensor (15) monitoring a filling level (L) of milk in the cooling tank;
a cooling system cooling the milk in the cooling tank, the cooling system comprising a cooling device (16) comprising
- an evaporator (19) in heat exchange contact with at least a portion of the bottom surface (12*a*) of the cooling tank,
- a compressor (20) connected by a suction side (20*a*) thereof to the evaporator, the compressor having a varying capacity that is controllable, the compressor being a capacity-modulated scroll compressor, the capacity being controllable by changing the modulation of the compressor,
- a condenser (21) connected to the high pressure side (20*b*) of the compressor, and
- an expansion valve (22) interconnected between the condenser and the evaporator,
- the evaporator, the compressor, the condenser, and the expansion valve forming a closed circuit, in which a refrigerant is able to be circulated, a second sensor (17) monitoring a parameter indicative of the pressure (P) or temperature at the suction side of the compressor or in the evaporator, and a control device (18) operatively connected (i) to the first sensor to receive the monitored filling level of milk in the cooling tank, (ii) to the second sensor to receive the monitored parameter, and (iii) to the compressor to control the capacity thereof in response to the monitored filling level of milk in the cooling tank and the monitored parameter, the control device controlling the capacity of the compressor by changing the modulation of the compressor such that the pressure or temperature at the suction side of the compressor or in the evaporator is regulated towards a first desired value ($P_{1TH}$) when the monitored filling level of milk in the cooling tank is below a first threshold level ($L_{TH}$); and a temperature sensor sensing a cooling tank temperature of the milk in the cooling tank, wherein the control device controls the compressor in response to the sensed temperature when the monitored filling level of milk in the cooling tank is above the first threshold level.

2. The system of claim 1, wherein the first desired value ($P_{1TH}$) is a pressure at which the refrigerant has a boiling temperature of between about −5 and +3° C.

3. The system of claim 1, wherein the first desired value ($P_{1TH}$) is a pressure at which the refrigerant has a heat exchange capacity that ensure that milk in the cooling tank does not freeze even when there are only small amounts of milk therein.

4. The system of claim 1, further comprising an agitator (14) within the cooling tank agitating milk therein, the agitator requiring the filling level of milk in the cooling tank to be above the first threshold level ($L_{TH}$) to be able to agitate the milk.

5. The system of claim 1, wherein the control device controls the compressor in response to the sensed temperature such that the compressor is only run intermittently and then at full capacity.

6. The system of claim 1, wherein the control device controls the capacity of the compressor such that the pressure or temperature at the suction side of the compressor or in the evaporator is regulated towards a second desired value ($P_{2TH}$) when the monitored filling level of milk in the cooling tank is above the first threshold level, wherein the second desired value is lower than the first desired value.

7. The system of claim 6, wherein the second desired value ($P_{2TH}$) is a pressure at which the refrigerant has a boiling temperature of between about −10 and 0° C.

8. The system of claim 1, wherein the control device controls the capacity of the compressor such that the pressure or temperature at the suction side of the compressor or in the evaporator is regulated towards a second desired value ($P_{2TH}$) when the monitored filling level of milk in the cooling tank is above the first threshold level, but below a second threshold level ($L_{2TH}$), and controls the compressor in a different manner when the monitored filling level of milk in the cooling tank is above the second threshold level.

9. The system of claim 8, further comprising a temperature sensor senses a cooling tank temperature of the milk in the cooling tank, wherein the control device controls the compressor in response to the sensed temperature when the monitored filling level of milk in the cooling tank is above the second threshold level.

10. The system of claim 8, wherein the control device controls the capacity of the compressor such that the pressure or temperature at the suction side of the compressor or in the evaporator is regulated towards a third desired value ($P_{3TH}$) when the monitored filling level of milk in the cooling tank is above the second threshold level, and wherein the third desired value is lower than the second desired value.

11. A milking system (31) comprising:
- a milking device (32) configured to milk animals; and
- the system (11) for storing and cooling milk of claim 1 connected to the milking device to collect milk as milked by the milking device.

* * * * *